May 9, 1939.  D. A. BOYD  2,157,995

SEAL

Filed Oct. 29, 1937

INVENTOR
DONALD A. BOYD
BY
ATTORNEY

Patented May 9, 1939

2,157,995

UNITED STATES PATENT OFFICE 2,157,995

SEAL

Donald A. Boyd, Detroit, Mich.

Application October 29, 1937, Serial No. 171,723

1 Claim. (Cl. 288—1)

This invention relates to a packing and more particularly to a packing member which may be inserted as a unit in a housing surrounding a centrally located shaft.

An object of the invention is to provide an inexpensive structure which may be assembled with a minimum number of parts, and to provide means for sealing the packing member with the outer periphery of the cage member.

More particularly, the invention has for its object the provision of a sealing structure comprising a packing member and a retainer bonded or otherwise secured to a packing member.

Other objects and advantages of the invention will be more apparent from the following description taken in connection with the accompanying drawing, in which.

Figure 1:
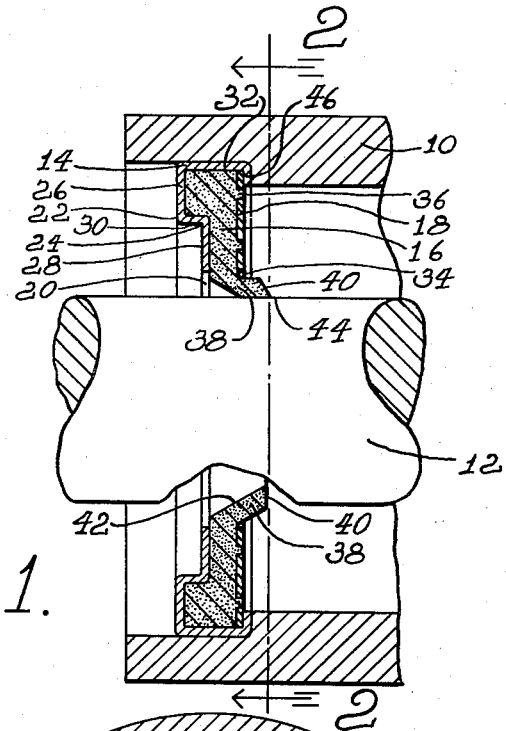
Fig. 1 is a longitudinal sectional view through a housing illustrating the improved seal in section and surrounding a centrally located shaft, the latter being shown in elevation and a portion thereof being broken away showing the packing member in its normal condition.
Figure 2:
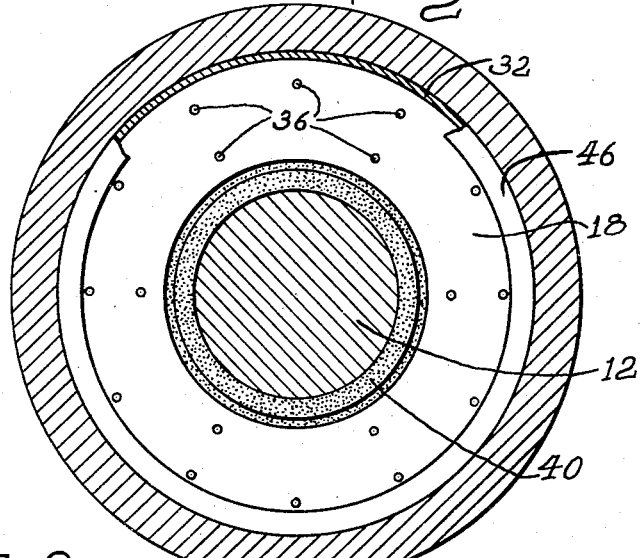
Fig. 2 is a sectional view on line 2—2 of Fig. 1 showing an end view of the seal, a portion thereof being broken away and in section.

Referring to the drawing, the seal is adapted to be inserted in a housing 10 in encompassing relation to a centrally located shaft 12. The seal consists of a retainer 14 and a packing member 16 secured to a backing 18. The retainer 14 comprises a cup-shaped member having an opening 20 in its bottom wall 22 for reception of the shaft 12. The bottom wall 22 is depressed as at 24 forming axially spaced radially and oppositely extending flanges 26 and 28 with an intermediate flange 30 extending parallel to the outer peripheral portion 32 of the retainer 14.

The packing 16 is formed from any suitable pliable material which may be molded, and in the form illustrated it is preferably made of molded rubber bonded to the backing member 18. The latter is a substantially flat washer having a central opening 34 of substantially the diameter of the opening 20 in the retainer 14. The backing member 18 has a plurality of openings 36 into which the molded material extends to form a retaining means. The material 16 may be vulcanized to the inner surface of the backing 18.

The packing 16 extends diagonally inwardly and radially through the opening 34 of the backing 18 and has its outer edge 40, in normal condition, extending substantially radially or perpendicular to the axis of the shaft 12, as shown at the bottom of the view in Fig. 1. This flange portion, represented by the numeral 38, is resilient and pliable so that when it surrounds the shaft 12 a portion of the diagonal wall 42 is in engagement with the outer periphery of the shaft 12, and the outer edge 40 extends diagonally, presenting a knife-like edge contact, as shown at 44, with the outer periphery of the shaft 12, as shown at the upper half of Fig. 1.

The cup-shaped member 14 is preferably formed by stamping, and the packing 16 is bonded to the backing 18, these parts then being inserted within the cup and the outer edge of the flange 32 turned inwardly as at 46 for applying a pressure to the backing 18 and packing 16 for retaining the latter in assembled position.

Various changes, including the size, shape and arrangement of parts, may be made without departing from the spirit of the invention and it is not my intention to limit the scope thereof other than by the terms of the appended claim.

What I claim is:

A self contained seal for insertion as a unitary structure in a housing surrounding a shaft comprising a centrally apertured cup having an annular peripheral flange portion, a radially extending flange portion integrally connected to one edge of said annular flange, said radially extending flange having a portion bent at right angles thereto spaced from and extending substantially parallel to said annular flange and a portion bent radially toward the axis of said seal, said right angular portion providing a retaining shoulder intermediate the extremities of said radially extending flange portion, an apertured radially extending ring spaced from said radially extending flange, a short radially extending flange integrally connected to the other edge of said annular flange in abutting relation with the outer edge of said apertured ring, and a composition material filling all of the space between all of said flanges and said ring including the apertures in said ring and extending radially and axially beyond said ring for pressure engagement with a shaft, said shoulder retaining said material against radial displacement.

DONALD A. BOYD.